(12) United States Patent
Nakaji

(10) Patent No.: US 6,396,625 B1
(45) Date of Patent: May 28, 2002

(54) OPTICAL AMPLIFIER AND OPTICAL FIBER MODULE INCLUDED IN THE SAME

(75) Inventor: Haruo Nakaji, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/791,764

(22) Filed: Feb. 26, 2001

(30) Foreign Application Priority Data

Dec. 26, 2000 (JP) ........................................ 2000-395516

(51) Int. Cl.$^7$ ................................................ H01S 3/00
(52) U.S. Cl. ............................. 359/341.41; 359/341.43
(58) Field of Search ........................ 359/341.42, 341.43, 359/341.41, 341.4, 177, 337

(56) References Cited

U.S. PATENT DOCUMENTS

| | | | | |
|---|---|---|---|---|
| 5,025,142 A | * | 6/1991 | Aoshima et al. | 250/201.9 |
| 5,822,112 A | * | 10/1998 | Itou et al. | 359/341 |
| 6,229,643 B1 | * | 5/2001 | Nakamura | 359/341 |

FOREIGN PATENT DOCUMENTS

| | | |
|---|---|---|
| JP | 08-179388 | 12/1996 |
| JP | 409064437 A * | 3/1997 |

OTHER PUBLICATIONS

Seo Yeon Park, Hyang Kyun Kim, Gap Yeol Lyu, Sun Mo Kang, and Sang–Yung Shin, "Dynamic Gain and Output Power Control in a Gain–Flattened Erbium–Doped Fiber Amplifier", IEEE Photonics Technology Letters, vol. 10, No. 6, Jun. 1998, pp. 787–789.

A.K. Srivastava, Y. Sun, J.L. Zyskind, and J.W. Sulhoff, "EDFA Transient Response to Channel Loss in WDM Transmission System", IEEE Photonics Technology Letters, vol. 9, No. 3, Mar. 1997, pp. 386–388.

* cited by examiner

Primary Examiner—Mark Hellner
(74) Attorney, Agent, or Firm—McDermott, Will & Emery

(57) ABSTRACT

The present invention relates to an optical amplifier and the like comprising a structure for effectively suppressing transient output signal power fluctuations caused by delays in control. The optical amplifier including an amplification optical fiber comprises a control system for monitoring, through a light-receiving device, power fluctuations in part of light tapped by a branching device and regulating the power of pumping light outputted from a pumping light source. A delay medium is disposed between the branching device and the amplification optical fiber, so as to reduce the difference between the time required for signals transmitted through the branching device to reach the input end of the amplification optical fiber and the response time of the control system, thereby suppressing fluctuations in the output signal level. In particular, the delay medium has an insertion loss of 3 dB or less in order to minimize the loss at the input end of the amplification optical fiber so as to ameliorate noise figure.

12 Claims, 4 Drawing Sheets

OPTICAL AMPLIFIER AND OPTICAL FIBER MODULE INCLUDED IN THE SAME

BACKGROUND OF THE INVENTION

1. Field of the Invention

The present invention relates to an optical amplifier applicable to wavelength division multiplexing (WDM) transmission systems, and an optical fiber module included in the optical amplifier.

2. Related Background Art

In WDM transmission systems including optical amplifiers, OADM (Optical Add/Drop Multiplexer) and OXC (Optical cross Connect) have recently been incorporated in order to improve the reliability and operating efficiency of each system as a whole. In such a WDM system, attention is paid to transitional output signal power fluctuations in optical amplifiers occurring due to changes in the input power output. Therefore, it is required for optical amplifiers to be controlled such that the output signal power (output signal level) per channel becomes constant even if the input power changes.

As means for suppressing the transitional output signal power fluctuations caused by input signal power fluctuations occurring due to changes in the number of signal channels, high-speed automatic gain control (AGC) has been proposed.

Here, the response speed of AGC is required to become faster as the speed at which the number of signal channels changes is faster, and as the number of the added or dropped signal increases.

As a technique for speeding up AGC, Seo Yeon Park, et al., "Dynamic Gain and Output Power Control in a Gain-Flattened Erbium-Doped Fiber Amplifier," IEEE PHOTONICS TECHNOLOGY LETTERS, Vol. 10, No. 6, June 1998, for example, proposes feed-forward control by detecting only the power of input signal (input signal level), and a pumping light power corresponding to the power of input signal is calculated by use of a linear expression, so as to maintain a constant gain. This AGC technique can achieve higher speed more easily as compared with conventional feedback control, whereby a response time of 650 ns is realized in actually developed control circuits.

SUMMARY OF THE INVENTION

The inventor has studied the prior art and, as a result, has found a problem as follows. Namely, even if feed-forward control is carried out in a conventional optical amplifier by detecting power fluctuations in input signals, the control starting time will be delayed due to a delay in a control circuit, whereby overshoot may occur by the amount of delay in the control circuit.

If the response time of the control circuit controlling pumping light sources are substantially the same, the power of pumping light outputted from the pumping light source can be regulated at substantially the same time when a power fluctuation in input signals is detected in the vicinity of an input end of an optical amplifier (the fluctuation is detected before amplification), whereby transient power fluctuations in output signals will hardly occur. However, in actual control circuits, the pumping power is controlled behind the input power fluctuation, because of the delay time of the control circuits. Therefore, even if a power fluctuation in input signals is detected in the vicinity of an input end of an optical amplifier (at the point of time indicated by arrow A in FIG. 7), a transient power fluctuation (dynamic gain fluctuation $P_D$) in output signals will occur in an optical amplifier for the duration of response time $t_1$ of the control circuit after the actual power fluctuation in input signals is generated as shown in FIG. 7 (see A. K. Srivastava, et al., "EDFA Transient Response to Channel Loss in WDM Transmission System," IEEE PHOTONICS TECHNOLOGY LETTERS, Vol. 9, No. 3, March 1997).

In order to overcome the above-mentioned problem, it is an object of the present invention to provide an optical amplifier comprising a structure which can effectively suppress transient output signal power fluctuations occurring due to delays in control, and an optical fiber module included in the same.

The optical amplifier according to the present invention is an optical device, employed in a WDM transmission system for transmitting a plurality of channels of signals included in a predetermined signal wavelength band, for amplifying the signals propagating through an optical transmission line included in the WDM transmission system.

In order to overcome the above-mentioned problem, the optical amplifier according to the present invention comprises, at least, a branching device, a light-receiving device, an amplification optical device (first amplification optical fiber), a pumping light source, a delay medium, a multiplexer, and a control system. The branching device taps part of light including the signals propagating through the optical transmission line. The light-receiving device detects a power of the part of light tapped by the branching device. The amplification optical fiber is an optical fiber doped with a rare-earth element or the like for amplifying the signals. The pumping light source launches pumping light of a predetermined wavelength into the amplification optical fiber using the multiplexer. The delay medium is an optical device, arranged between the branching device and the multiplexer, for delaying the light reaching the input end of the amplification optical fiber from the branching device; and has an insertion loss of 3 dB or less. The control system monitors, by way of the light-receiving device, the power of the part of light tapped by the branching device, and controls the pumping light source.

Theoretically, transient power fluctuations in output signals can fully be suppressed if the pumping light power can intentionally be changed at the same time when the fluctuation in input signal level occurring in the vicinity of the input end of the optical amplifier is detected (the amount of change in pumping light power being adjusted according to the amount of fluctuation in input signal power). However, it is unrealistic for the response time from the detection of fluctuation to the power control of pumping light to become zero. Therefore, the present invention utilizes the delay medium, so as to delay the signal input to the amplification optical fiber, thus making it possible to detect the input signal power before amplification.

Since a delay medium having an insertion loss of 3 dB or less is employed, the optical amplifier according to the present invention can effectively suppress the transient power fluctuation in output signals whitout an excess deterioration of noise figure.

Specifically, it is preferred that the signal delay time given by the delay medium be 1 $\mu$s or more but 50 $\mu$s or less. Preferably, the delay medium includes a single-mode optical fiber having a length of 0.2 km or more but 10 km or less. Since the transmission loss of a single-mode optical fiber is usually 0.2 dB/km, it can delay input signals to the amplification optical fiber by a time within the range of 1 $\mu$s to 50 $\mu$s with minimizing the excess degradation of noise characteristics.

In the case where the delay medium is longer, the delay medium preferably includes a dispersion-shifted optical fiber in order to restrain the dispersion of the delay medium itself from increasing. The delay medium may also include a dispersion-compensating optical fiber arranged between the single-mode optical fiber and the amplification optical fiber. This is because of the fact that, when a high-speed operation is required in L band (1565 nm to 1620 nm) in the optical amplifier, it will be preferable if the dispersion of the amplification optical fiber is compensated for in order to improve the dispersion tolerance of the optical amplifier.

The signal delay time given by the delay medium must be longer than the response time of the control system from when the signal power fluctuation is detected until when the control of the pumping light source is started. Also, the signal delay time given by the delay medium must be longer than a sampling time in which the part of light tapped by the branching device is monitored in the control system. This aims at making it possible to adjust the pumping light power in conformity to power fluctuations in input signals.

The control system carries out AGC by utilizing a linear expression $P_P = a \cdot P_{IN} + b$ (where a and b are constants) which provides a relationship between the power $P_{IN}$ of the part of light tapped by the branching device and the power $P_P$ of the pumping light outputted from the pumping light source. This aims at enabling high-speed control by use of feed-forward control. However, even when transient output signal level fluctuations are suppressed during the control time $t_2$ as shown in FIG. 7, there is a possibility of a static gain fluctuation $P_Q$ occurring if AGC is carried out in a state where the average value (time average) of saturation power of output signals varies between before and after the fluctuation.

Therefore, it is preferred that the optical amplifier according to the present invention further comprise a spectrum analyzer for monitoring a signal distribution within a signal wavelength band at the output end of the amplification optical fiber (first amplification optical fiber). Here, the control system detects the signal distribution within the signal wavelength band at the output end of the amplification optical fiber (first amplification optical fiber), and updates the constants a and b in the above-mentioned linear expression utilized for AGC.

For effectively suppressing the static gain fluctuation $P_Q$, the control system may update the constants a and b in the above-mentioned linear expression utilized for AGC by using an amplification factor ($P_{OUT}/P_{IN}$) given by the ratio of the power $P_{IN}$ of the part of light tapped by the branching device to the amplified optical power $P_{OUT}$ at the output end of the amplification optical fiber.

The optical amplifier according to the present invention preferably includes an optical fiber module having respective terminals to be connected to the light-receiving device, pumping light source, and optical transmission line so as to reduce the insertion loss of the optical amplifier. The optical fiber module comprises a single-mode optical fiber to be fusion-spliced to the optical transmission line, a delay fiber acting as the delay medium to be fusion-spliced to the single-mode optical fiber, an amplification optical fiber to be fusion-spliced to the delay fiber, a first fiber coupler for tapping part of light including a signal having reached the optical amplifier before being fed to the delay fiber, and a second fiber coupler for supplying the pumping light from at least one of the input and output ends of the amplification optical fiber.

Specifically, the single-mode optical fiber has a first end to be fusion-spliced to the output end of the optical transmission line through which a plurality of channels of signals included in a predetermined signal wavelength band propagate, and a second end opposing the first end; and constitutes a part of the optical transmission line. The delay fiber has a first end fusion-spliced to the second end of single-mode optical fiber, and a second end opposing the first end. The amplification optical fiber has a first end fusion-spliced to the second end of delay fiber, and a second end opposing the first end. The first fiber coupler is arranged near a fused part between the second end of single-mode optical fiber and the first end of delay fiber. Preferably, the second fiber coupler is arranged near a fused part between the second end of delay fiber and the first end of amplification optical fiber, or near the second end of amplification optical fiber.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
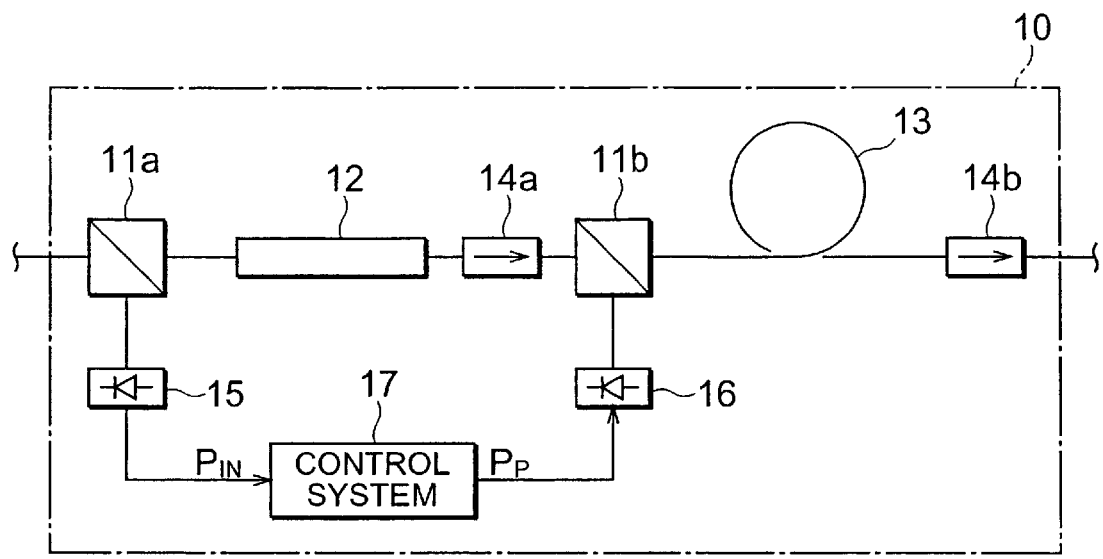
FIG. 1 is a diagram showing the configuration of a first embodiment of the optical amplifier according to the present invention.

In the following, embodiments of the optical amplifier according to the present invention and the optical fiber module included therein will be explained with reference to FIGS. 1 to 6. In the explanation of drawings, constituents identical to each other will be referred to with numerals identical to each other without repeating their overlapping descriptions. The proportions of dimensions in the drawings do not always match those explained.

FIG. 1 is the configuration of a first embodiment of the optical fiber amplifier according to the present invention. In FIG. 1, the optical amplifier 10 according to the first embodiment comprises, successively in the advancing direction of signal light, a branching device 11a, a delay medium 12, an optical isolator 14a, a multiplexer 11b, an amplification optical fiber 13, and an optical isolator 14b. The branching device 11a tapes part of light including a plurality of channels of signals having reached there from an optical transmission line. The delay medium 12 functions such that signals transmitted through the branching device 11a delay reaching the input end of the amplification optical fiber 13. The multiplexer 11b combines pumping light and the signal transmitted through the delay medium 12 and launches into the amplification optical fiber 13.

The optical amplifier 10 further comprises a light-receiving device 15 (PD) for monitoring the power of the part of light tapped by the branching device 11a, a pumping light source 16 (LD), and a control system 17 which controls the pumping light source in conformity to power fluctuations of the tapped part of light (in a feed-forward control fashion) while monitoring the power of tapped part of light by way of the light-receiving device 15.

In general, the gain coefficient $\gamma_s$ in an optical amplifier having an amplification optical fiber doped with erbium or the like is approximately represented by the following expression (1):

$$\gamma_s = \frac{g}{1 + \frac{P_P^{th}}{P_P} \cdot \frac{P_S}{P_{sat}}} \qquad (1)$$

where g is the unsaturated gain;

$P_P^{th}$ is the threshold power of pumping light;

$P_P$ is the pumping light power;

$P_S$ is the signal power; and $P_{sat}$ is the saturation power.

According to the above-mentioned expression (1), for making the gain coefficient $\gamma_s$ constant, i.e., for making the gain of optical amplifier constant, it will be sufficient if $(P_P^{th} \cdot P_S)/(P_P^{th} \cdot P_{sat})$ is made constant. If the power of input signal is determined, then the pumping light power necessary for AGC is calculated by the above-mentioned expression (1). Therefore, utilizing this expression (1) enables AGC based on feed-forward control (regulating the pumping light power while monitoring only the input signal power). Here, the pumping light power $P_P$ necessary for the above-mentioned AGC can be represented by the following linear expression (2):

$$P_P = a \cdot P_{IN} + b \qquad (2)$$

where $P_P$ is the pumping light power;

$P_{IN}$ is the input signal power; and a and b are constants.

Feed-forward control can realize higher-speed AGC as compared with feedback control in which input and output are detected. However, if the signal power is detected at the input end of the optical amplifier, and the pumping light power is controlled according to the result of detection, then the power of input signals will fluctuate by the response time of the control system, whereby a transient power fluctuation may occur in output signals.

A. K. Strivastava, "EDFA Transient Response to Channel Loss in WDM Transmission System," IEEE PHOTONICS TECHNOLOGY LETTERS, Vol. 9, No. 3, March 1997 reports transient output signal power fluctuations caused by delays in regulation of pumping light power with respect to power fluctuations in input signals. From this report, it can be seen that the transient power fluctuations in output signals can be suppressed more as delays in regulation of pumping light power with respect to power fluctuations in input signals are smaller. Ideally, the transient power fluctuations in output signals can substantially be suppressed to zero if the pumping light power can be changed by an appropriate amount at the same time when a power fluctuation is generated in input signals. Though the response time in the control system may be made sufficiently short in order to address the above-mentioned problem, there is a limit to shortening the response time of the control system.

Therefore, the optical amplifier according to the present invention is provided with a structure for delaying signals to a certain extent (at least by the response time of the control system) during the period of time from when a change in power of input signals is detected until when a fluctuation in signal power occurs at the input end of the amplification optical fiber. This structure can make the power fluctuation timing of input signals at the input end of amplification optical fiber and the intentional fluctuation timing of pumping light power coincide with each other, whereby the transient power fluctuations in output signals can be suppressed effectively. Also, since the input signals are delayed by an appropriate amount, the response speed required for the control system is alleviated, which makes it easier to design the control system.

Operations of the optical amplifier 10 according to the first embodiment will now be explained with reference to FIG. 1. In the optical amplifier 10, part of light including a plurality of channels of signals propagated through an optical transmission line is tapped by the branching device 11a, and power fluctuations of thus tapped part of light is detected by the light-receiving device 15. On the other hand, the remaining part of light transmitted through the branching device 11a passes through the delay medium 12, optical isolator 14a, and multiplexer 11b in succession, so as to reach the amplification optical fiber 13. While the light transmitted through the branching device 11a is propagating through the delay medium 12, the control system 17 detects the power fluctuation of input signals by way of the light-receiving device 15, and controls the pumping light source 16 so as to change the pumping light power.

At the input end of amplification optical fiber 13, due to the foregoing configuration, the input signals and pumping light attain a state where their respective power fluctuations are substantially synchronized with each other. As a result, signals amplified by the optimized gain are outputted from the amplification optical fiber 13, and thus amplified signals are sent out to an optical transmission line by way of the optical isolator 14b.

For improving the noise figure of the optical amplifier 10, it is necessary that at least the loss at the input end of amplification optical fiber 13 be made as low as possible. Therefore, it is preferred that the insertion loss of the delay medium 12 inserted into the input end side of the amplification optical fiber 13 be as small as possible. In this regard, a single-mode optical fiber having an insertion loss of 3 dB or less is suitable in order to suppress the excess degradation of noise characteristics, which can yield a delay of about 5 µs per km.

In the case where an optical fiber having a large chromatic dispersion is employed as an optical fiber acting as the delay medium 12 (hereinafter referred to as delay fiber), a separate dispersion-compensating optical fiber is necessary. Preferably, the delay fiber has a chromatic dispersion which is as small as possible, since it eliminates the need for inserting a separate optical fiber which compensates for the dispersion. In the case where the delay fiber is longer, the delay fiber preferably includes a dispersion-shifted optical fiber in order to restrain the dispersion of the delay fiber itself from increasing. The delay fiber may include a dispersion-compensating optical fiber disposed between the single-mode optical fiber and the amplification optical fiber. This is because of the fact that, when a high-speed operation is required in L band (1565 nm to 1620 nm) in the optical amplifier, it is preferred that the dispersion of the amplification optical fiber 13 be compensated for in order to improve the dispersion tolerance of the optical amplifier 10.

In general, a WDM transmission system having a transmission capacity per signal channel of 10 Gbit/s can permit a cumulative dispersion up to ±1000 ps/nm. From this fact, a dispersion of ±200 ps/nm or less caused by the delay fiber is considered to be a permissible range in a WDM transmission system in which five stages of repeaters are inserted. It is needless to say that the cumulative dispersion should be further lowered as the transmission capacity per signal channel increases from now on.

Figure 2:
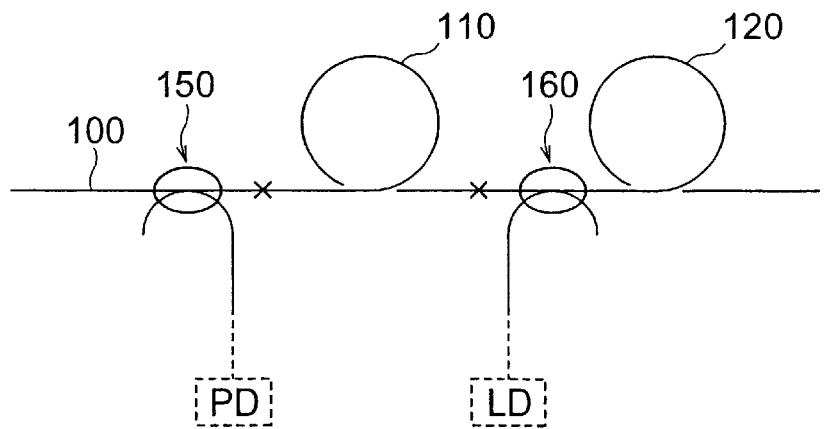
FIG. 2 is a diagram showing a specific configuration of the optical fiber module according to the present invention.

As mentioned above, the optical amplifier according to the present invention preferably includes an optical fiber module having respective terminals to be connected to the above-mentioned light-receiving device, pumping light source, and optical transmission line in order to reduce the insertion loss of the optical amplifier as shown in FIG. 2. The optical fiber module shown in FIG. 2 comprises a single-mode optical fiber 100 to be fusion-spliced to the optical transmission line, a delay fiber 110 (corresponding to the delay medium 12 in FIG. 1) to be fusion-spliced to the single-mode optical fiber 100, an amplification optical fiber 120 (corresponding to the amplification optical fiber 13 in FIG. 1) to be fusion-spliced to the delay fiber 110, a first fiber coupler 150 (corresponding to the branching device 11a in FIG. 1) for tapping part of light including signals having reached the optical amplifier before being fed into the delay fiber 110, and a second fiber coupler 160 (corresponding to the multiplexer 11b in FIG. 1) for supplying pumping light from at least one of the input and output ends of the amplification optical fiber 120. Thus, the input ends of the fiber couplers 150, 160 to which the light-receiving device and pumping light source are to be connected are open in the optical fiber module shown in FIG. 2, whereby users can select the light-receiving device and pumping light source in conformity to the design specification of the whole WDM transmission system.

Specifically, the single-mode optical fiber 100 in FIG. 2 has a first end to be fusion-spliced to the output end of the optical transmission line through which a plurality of channels of signals included in a predetermined signal wavelength band propagate, and a second end opposing the first end, thereby constituting a part of the optical transmission line. The delay fiber 110 has a first end fusion-spliced to the second end of single-mode optical fiber 100, and a second end opposing the first end. The amplification optical fiber 120 has a first end fusion-spliced to the second end of delay fiber 110, and a second end opposing the first end. The first fiber coupler 150 is disposed near the fused part between the second end of single-mode optical fiber 100 and the first end of delay fiber 110. The second fiber coupler 160 is disposed near the fused part between the second end of delay fiber 110 and the first end of amplification optical fiber 120. For inhibiting the deterioration of noise figure to the minimum, as mentioned above, the delay fiber 110 preferably includes an optical fiber having an insertion loss of 3 dB or less. In the case where the delay fiber 110 is longer, it preferably includes a dispersion-shifted optical fiber. For compensating for the dispersion of amplification optical fiber 120, the delay fiber 110 may include a dispersion-compensating optical fiber.

Ideally, since it is necessary to regulate (change) the pumping light power at the same time when the power of input signals fluctuates, the delay time applied by the delay medium 12 to signals is required to be substantially on a par with the response time of the control system 17 (including an arithmetic processing circuit) for controlling the pumping light source 16. In particular, it is necessary that the sampling time for detecting the input signal power be set sufficiently shorter than the signal delay time given by the delay medium 12. If the sampling time is longer than the signal delay time, then the timing for detecting the power fluctuation itself delays, whereby the delay applied to signals becomes meaningless. The sampling time is also determined by the speed at which the subject input signal power fluctuates.

In the case where the pumping light source 16 changes substantially stepwise, it will be sufficient if the signal delay time given by the delay medium 12 and the response time of the control system 17 (the period of time from when the fluctuation is detected until when the pumping light source 16 is controlled) are made identical to each other. In practice, however, waveforms are somewhat broad. Therefore, if the signal delay time is set slightly longer than the response time of control system 17, then the transient power fluctuations in output signals can effectively be suppressed.

In the feed-forward control (AGC) based on the above-mentioned expressions (1) and (2), AGC can be carried out by use of the above-mentioned expression (2) when the average value of saturation power of multiplexed signals is the same between before and after the power of input signals fluctuates. However, the saturation power is dependent on wavelength, so that the average value of saturation power is not always constant between before and after the fluctuation when the power of input signals fluctuates due to changes in the number of signal channels (see FIG. 7). In the case where the average value of saturation power varies, a static gain fluctuation $P_Q$ will occur if AGC is carried out with the constants a (gradient) and b (intercept) being fixed.

For suppressing such a static gain fluctuation $P_Q$, it is preferred that the position of signal wavelength within a signal wavelength band be monitored, and that the constants a, b in the above-mentioned expression (2) be regulated according to thus detected signal distribution.

Figure 3:
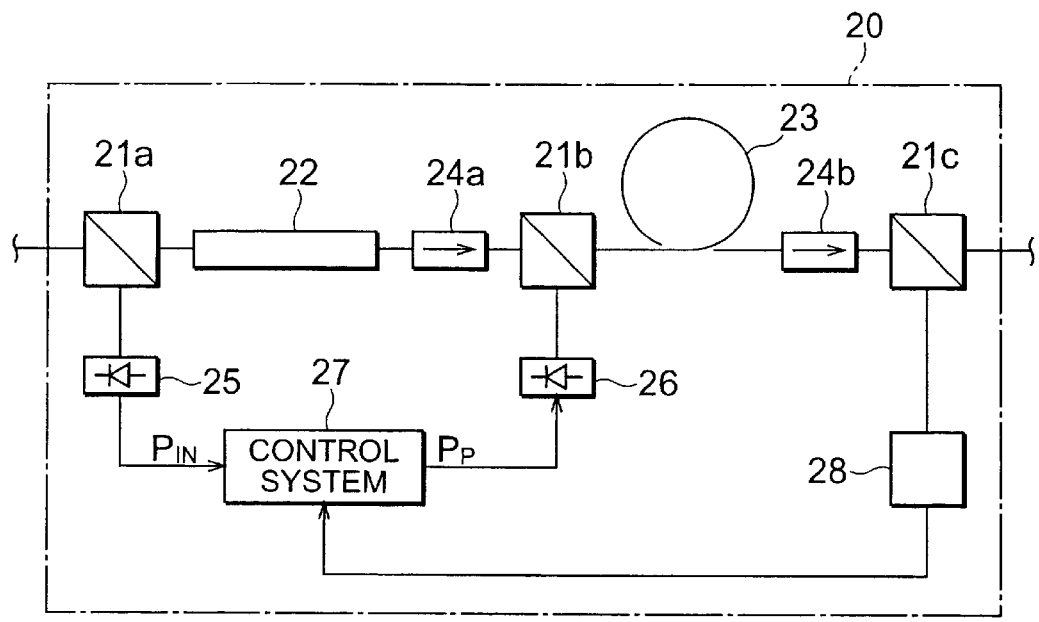
FIG. 3 is a diagram showing the configuration of a second embodiment of the optical amplifier according to the present invention.

FIG. 3 is the configuration of a second embodiment of the optical amplifier according to the present invention accomplished based on the consideration mentioned above.

As shown in FIG. 3, the optical amplifier 20 according to the second embodiment has the same configuration as that of the first embodiment in that it comprises a branching device 21a, a delay medium 22, an optical isolator 24a, a multiplexer 21b, an amplification optical fiber 23, an optical isolator 24b, a light-receiving device 25, a pumping light source 26, and a control system 27. However, in order to suppress the above-mentioned static gain fluctuation, the optical amplifier 20 according to the second embodiment further comprises a branching device 21c for tapping part of light including output signals from the amplification optical fiber 23, and a spectrum analyzer 28 for monitoring the signal distribution within the signal wavelength band concerning the part of light tapped by the branching device 21c.

Figure 7:
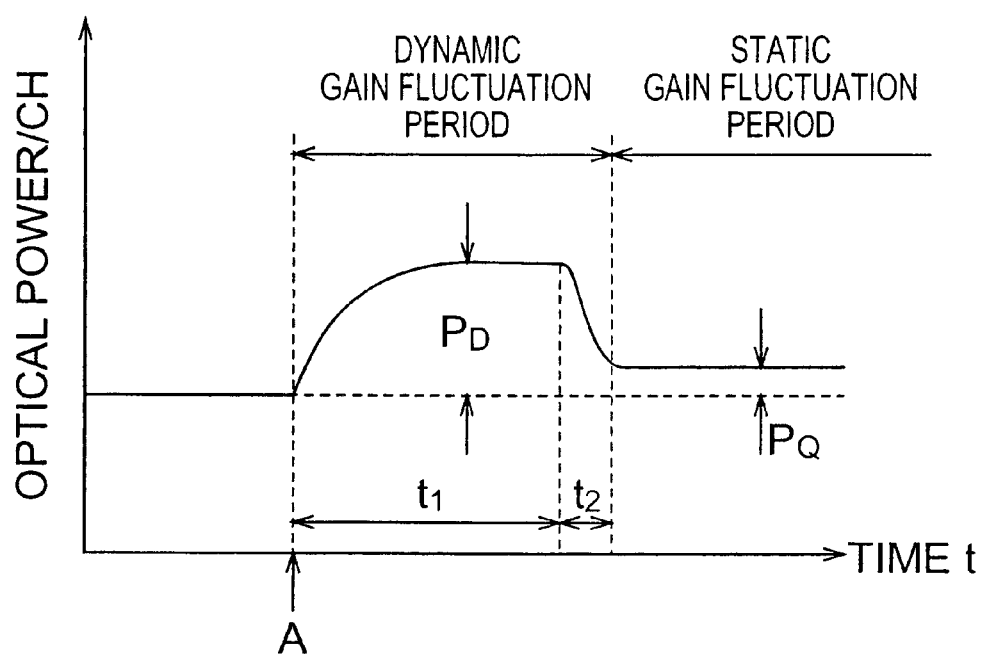
FIG. 7 is a graph for explaining a problem of AGC in a conventional optical amplifier.

The control system 27 carries out AGC by utilizing the above-mentioned linear expression of $P_P = a \cdot P_{IN} + b$ (where a and b are constants) defining the relationship between the power $P_{IN}$ of the part of light tapped by the branching device 21a and the power $P_P$ of pumping light outputted from the pumping light source. It aims at enabling higher-speed control based on feed-forward control. However, even when the above-mentioned transient output signal level fluctuations are suppressed during the control time $t_2$, there is a possibility of the static gain variation $P_Q$ occurring if AGC is carried out in a state where the average value (time average) of saturation power of output signals varies between before and after a fluctuation as shown in FIG. 7. Therefore, in the optical amplifier 20 according to the second embodiment, the control system 27 detects the signal distribution within the signal wavelength band at the output end of amplification optical fiber 23 by way of the spectrum analyzer 28, so as to update the constants a and b in the above-mentioned linear expression (2) utilized for AGC, thereby effectively suppressing the static gain fluctuation $P_Q$.

Figure 4:
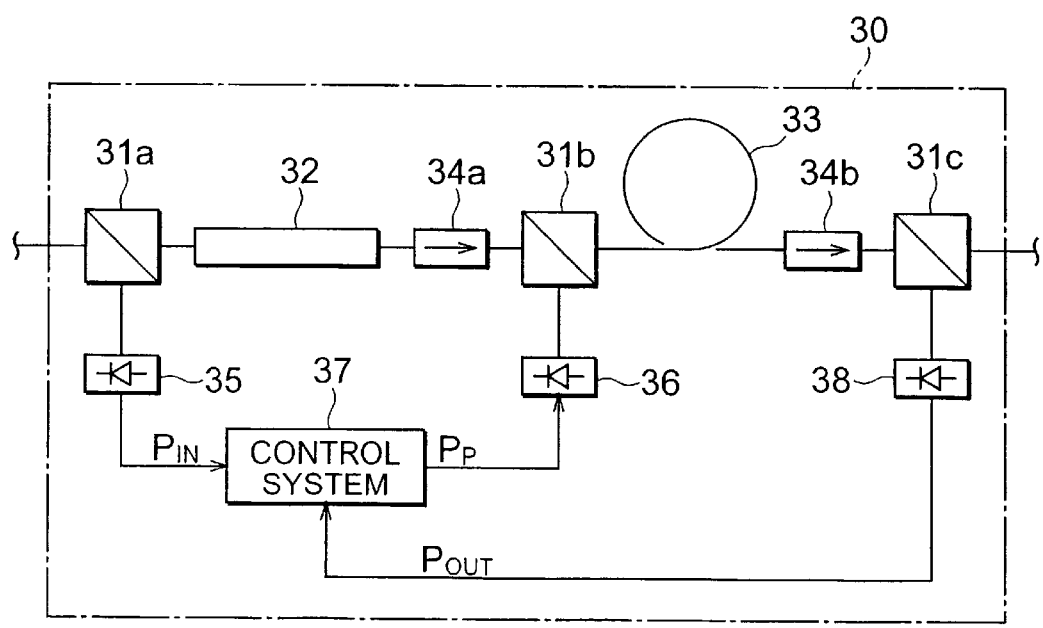
FIG. 4 is a diagram showing the configuration of a third embodiment of the optical amplifier according to the present invention.

FIG. 4 is a view showing the configuration of a third embodiment of the optical amplifier according to the present invention, which is characterized in that it comprises a configuration for lowering the static gain fluctuation $P_Q$ (see FIG. 7) as in the second embodiment.

Namely, as shown in FIG. 4, the optical amplifier 30 according to the third embodiment has the same configuration as that of the first embodiment in that it comprises a branching device 31a, a delay medium 32, an optical isolator 34a, a multiplexer 31b, an amplification optical fiber 33, an optical isolator 34b, a light-receiving device 35, a pumping light source 36, and a control system 37. However, in order to suppress the above-mentioned static gain fluctuation, the optical amplifier 30 according to the third embodiment further comprises a branching device 31c for tapping part of light including output signals from the amplification optical fiber 33, and a light-receiving device 38 for detecting the power of the part of light tapped by the branching device 31c.

The control system 37 updates the constants a and b in the above-mentioned linear expression (2) utilized for AGC by using an amplification factor ($P_{OUT}/P_{IN}$) given by the ratio of the power $P_{IN}$ of the part of light tapped by the branching device 31a to the amplified optical power $P_{OUT}$ at the output end of the amplification optical fiber 33.

Further, the optical amplifier according to the present invention can be modified in various manners. For example, there are many optical amplifiers each comprising a plurality of stages of amplifying sections. In such a configuration, if a delay medium is inserted immediately upstream the amplifying section at each stage, then the transmission loss within the optical amplifier increases, thereby deteriorating noise characteristics, which is unfavorable.

Therefore, the optical amplifier according to a fourth embodiment comprises a structure in which a delay medium is inserted immediately upstream only the amplifying section at the first stage, the power of signals before reaching the delay medium is detected, and the pumping light power is regulated for the amplifying section at each stage according to the result of detection.

Figure 5:
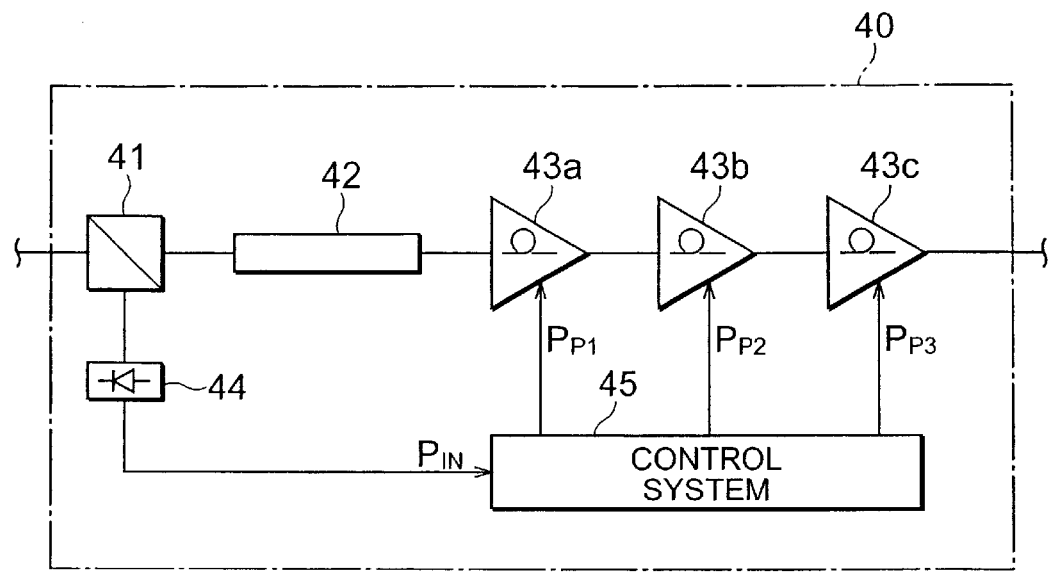
FIG. 5 is a diagram showing the configuration of a fourth embodiment of the optical amplifier according to the present invention.

FIG. 5 is a view showing the configuration of a fourth embodiment of the optical amplifier according to the present invention. In FIG. 5, the optical amplifier 40 according to the fourth embodiment comprises, successively in the advancing direction of signals propagated through the optical transmission line, a branching-device 41 for tapping part of light including the signals, a delay medium 42, a plurality of stages of amplifying sections 43a to 43c (each comprising an amplification optical fiber and a pumping light source), a light-receiving device 44, and a control system 45 for feed-forward control (AGC) of each of the plurality of stages of amplifying sections 43a to 43c.

Since the optical amplifier 40 according to the fourth embodiment is configured such that the branching device 41 is provided upstream the plurality of stages of amplifying sections 43a to 43c, whereas part of light (including the signals) tapped by the branching device 41 is monitored, power fluctuations in input signals can be detected more rapidly than in a configuration in which power fluctuations in input signals are detected immediately upstream each amplifying section, thereby enabling AGC favorably following the power fluctuations in input signals. Also, in the optical amplifier 40 according to the fourth embodiment, the delay medium 42 is disposed between the branching device 41 and the amplifying section 43a at the first stage in order for the respective timings for detecting the power fluctuation in input signals at the plurality of stages of amplifying sections 43a to 43c and regulating the pumping light power (outputting control signals $P_{P1}$ to $P_{P3}$ from the control system 45 to respective pumping light sources included in the individual amplifying sections 43a to 43c) to apparently coincide with each other.

The optical amplifier 40 according to the fourth embodiment comprising the plurality of stages of amplifying sections 43a to 43c downstream the delay medium 42 as such is suitable for WDM transmission systems in which OADM (Optical Add/Drop Multiplexer), OXC (Optical Cross Connect), and the like are inserted.

In a WDM transmission system incorporated with OADM or OXC, there are often cases where the power fluctuation in input signals to the optical amplifier abruptly changes due to changes in the number of signal channels. In such a case, the applied optical amplifier is required to rapidly control the gain so as to keep it constant. The optical amplifier 40 according to the fourth embodiment can, as similar to other embodiments, detect the power fluctuation in input signals to each of the plurality of amplifying sections 43a to 43c before amplification, and can effectively suppress transient output signal power fluctuations.

The optical amplifier according to the present invention may further comprise a configuration in which signals to be fed into the delay medium are amplified beforehand.

Figure 6:
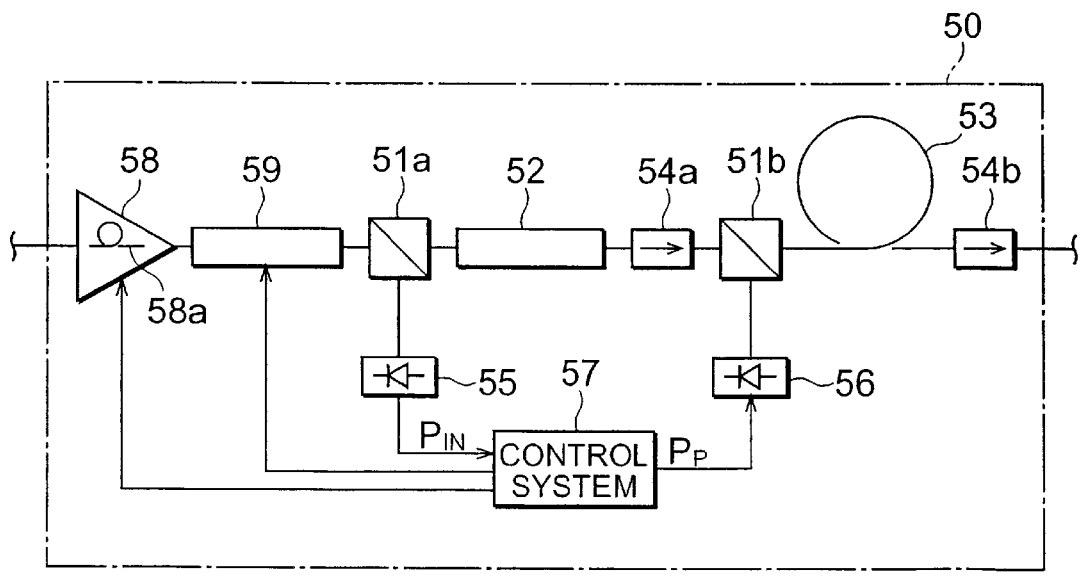
FIG. 6 is a diagram showing the configuration of a fifth embodiment of the optical amplifier according to the present invention.

FIG. 6 is a view showing the configuration of a fifth embodiment of the optical amplifier according to the present invention.

Basically as in the first embodiment, the optical amplifier 50 according to the fifth embodiment comprises, successively in the advancing direction of signals, a branching device 51a, a delay medium 52, an optical isolator 54a, a multiplexer 51b, an amplification optical fiber 53, and an optical isolator 54b, so that a part of an optical transmission line is constituted by them. It further comprises a light-receiving device 55 for monitoring power fluctuations of the part of light tapped by the branching device 51a, and a pumping light source 56 for supplying pumping light to the amplification optical fiber by way of the multiplexer 51b; and is configured such that a control system 57 detects power fluctuations in input signals by way of the light-receiving device 55 and controls (in AGC fashion) the pumping light source 56.

In particular, the optical amplifier 50 according to the fifth embodiment is characterized in that an amplifying section 58 (including an amplification optical fiber 58a) for amplifying input signals before detection is disposed upstream the branching device 51a. Disposed between the amplifying section 58 and the branching device 52a is an optical device 59 comprising one of a variable attenuator and a band-pass filter. Hence, in the optical amplifier 50 according to the fifth embodiment, a part of the optical transmission line is constituted by at least the delay medium 52 and two amplification optical fibers 53, 58a disposed so as to sandwich the delay medium 52 therebetween.

Thus configured optical amplifier 50 according to the fifth embodiment can also detect power fluctuations in input signals before amplification, and can effectively suppress transient output signal power fluctuations.

As in the foregoing, since a delay medium having an insertion loss of 3 dB or less is disposed upstream the amplification optical fiber so as to enable feed-forward control which reduces the difference between the timing for detecting power fluctuations in input signals and the timing for starting the pumping light power control, the present invention can effectively restrain transient power fluctuations in amplified signals outputted from the amplification optical fiber from occurring due to the above-mentioned difference. Since the insertion loss of the delay medium is 3 dB or less, it is also effective in improving the noise figure of the optical amplifier.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical amplifier disposed on an optical transmission line through which a plurality of channels of signals included in a predetermined wavelength band propagate, said optical amplifier comprising:

a branching device for tapping part of light including said signals propagating through said optical transmission line;

a light-receiving device for detecting a power of said part of light tapped by said branching device;

a first amplification optical fiber for amplifying said signals;

a pumping light source for supplying pumping light of a predetermined wavelength to said first amplification optical fiber;

a delay medium having an insertion loss of 3 dB or less arranged between said branching device and said first amplification optical fiber; and a control system for monitoring said power of said part of light tapped by said branching device through said light-receiving device, and controlling said pumping light source so as to regulate a power of said pumping light in conformity to a power fluctuation of said tapped part of light.

2. An optical amplifier according to claim 1, wherein said delay medium provides a signal delay time of 1 μs or more but 50 μs or less.

3. An optical amplifier according to claim 1, wherein said delay medium includes a single-mode optical fiber having a length of 0.2 km or more but 10 km or less.

4. An optical amplifier according to claim 3, wherein said delay medium includes a dispersion-shifted optical fiber.

5. An optical amplifier according to claim 3, wherein said delay medium includes a dispersion-compensating optical fiber arranged between said single-mode optical fiber and said first amplification optical fiber.

6. An optical amplifier according to claim 1, wherein a signal delay time given by said delay medium is longer than the response time of said control system from when said power fluctuation is detected until when said control of said pumping light source is started.

7. An optical amplifier according to claim 1, wherein a signal delay time given by said delay medium is longer than a sampling time in which said part of light tapped by said branching device is monitored in said control system.

8. An optical amplifier according to claim 1, wherein said control system carries out automatic gain control by utilizing a linear expression $P_P = a \cdot P_{IN} + b$ (where a and b are constants) which provides a relationship between the power $P_{IN}$ of said part of light tapped by said branching device and the power $P_P$ of said pumping light outputted from said pumping light source.

9. An optical amplifier according to claim 8, further comprising a spectrum analyzer for monitoring a signal distribution within said signal wavelength band at an output end of said first amplification optical fiber.

10. An optical amplifier according to claim 9, wherein said control system detects said signal distribution within said signal wavelength band, and updates said constants a and b in said linear expression utilized for automatic gain control.

11. An optical amplifier according to claim 8, wherein said control system updates said constants a and b in said linear expression utilized for automatic gain control by detecting an amplification factor ($P_{OUT}/P_{IN}$) given by the ratio of the power $P_{IN}$ of said part of light tapped by said branching device to the amplified optical power $P_{OUT}$ at said output end of amplification optical fiber.

12. An optical fiber module comprising:

a single-mode optical fiber having a first end to be fusion-spliced to an output end of an optical transmission line through which a plurality of channels of signals included in a predetermined signal wavelength band propagate, and a second end opposing said first end, said single-mode optical fiber constituting a part of said optical transmission line;

a delay fiber having a first end fusion-spliced to said second end of single-mode optical fiber, and a second end opposing said first end;

an amplification optical fiber having a first end fusion-spliced to said second end of delay fiber, and a second end opposing said first end;

a first fiber coupler arranged near a fused part between said second end of single-mode optical fiber and said first end of delay fiber; and a second fiber coupler arranged near a fused part between said second end of delay fiber and said first end of amplification optical fiber.

* * * * *